United States Patent [19]

Hocker, III

[11] Patent Number: 5,682,508
[45] Date of Patent: Oct. 28, 1997

[54] UART PROTOCOL THAT PROVIDES PREDICTABLE DELAY FOR COMMUNICATION BETWEEN COMPUTERS OF DISPARATE ABILITY

[75] Inventor: Lon O. Hocker, III, Falmouth, Mass.

[73] Assignee: Onset Computer Corporation, Pocasset, Mass.

[21] Appl. No.: 409,015

[22] Filed: Mar. 23, 1995

[51] Int. Cl.$^6$ .............................. G06F 13/12; G06F 13/14
[52] U.S. Cl. .................... 395/200.14; 395/200.13; 395/200.19; 395/551; 395/552
[58] Field of Search .................. 395/200.13, 200.14, 395/200.19, 849, 852, 878, 879, 880, 550, 551, 552; 364/240.8, 240.9, 929; 340/825.44; 370/476, 472

[56] References Cited

U.S. PATENT DOCUMENTS

| | | | |
|---|---|---|---|
| 4,143,418 | 3/1979 | Hodge et al. | 364/200 |
| 4,525,801 | 7/1985 | Kuwabara | 364/900 |
| 4,823,312 | 4/1989 | Michael et al. | 364/900 |
| 4,984,190 | 1/1991 | Katori et al. | 364/900 |
| 5,179,706 | 1/1993 | Swanson et al. | 395/725 |
| 5,481,675 | 1/1996 | Kapogiannis et al. | 395/200.13 |
| 5,604,870 | 2/1997 | Moss et al. | 395/280 |
| 5,617,542 | 4/1997 | Williams | 395/200.14 |

FOREIGN PATENT DOCUMENTS 0423036  4/1991  European Pat. Off. ........ G06F 13/20

OTHER PUBLICATIONS

Hall, "Mocroprocessors and Interfacing—Programmming and Hardware," McGraw Hill Book Co., 1986, pp. 442–448, Dec. 1986.
Bowers et al, Machine–Cycle Extension in a Data Processor, 6 Nov. 1981.

*Primary Examiner*—Alyssa H. Bowler
*Assistant Examiner*—Richard J. Gregson
*Attorney, Agent, or Firm*—Weingarten, Schurgin, Gagnebin & Hayes LLP

[57] ABSTRACT

A UART protocol which takes advantage of an SDO line space state to optimize communication between computers. A delay is provided by sending a byte of actual data followed by a dummy byte. The dummy byte is produced by placing the SDO line in the mark state, thus freeing up CPU time.

5 Claims, 2 Drawing Sheets

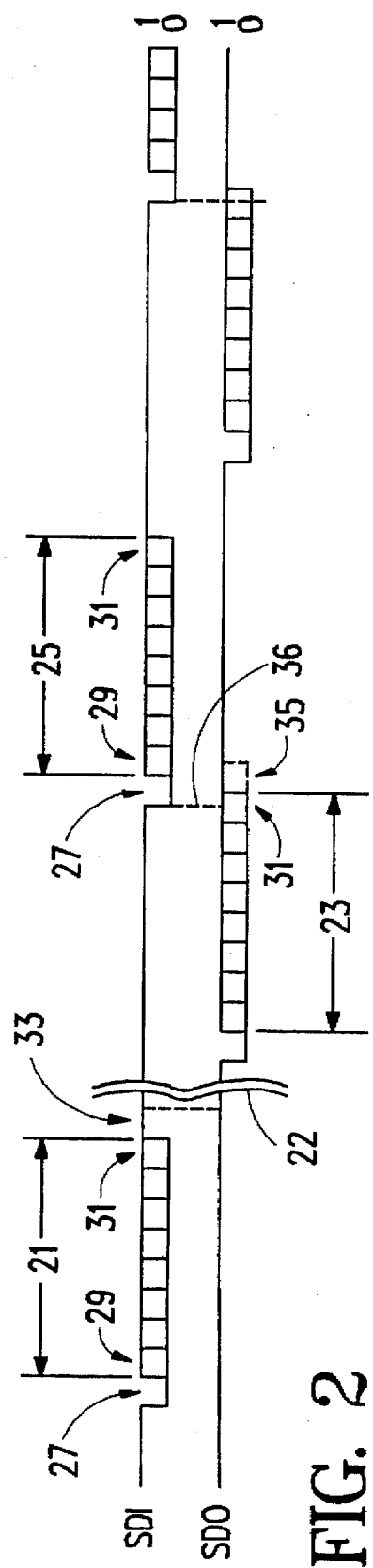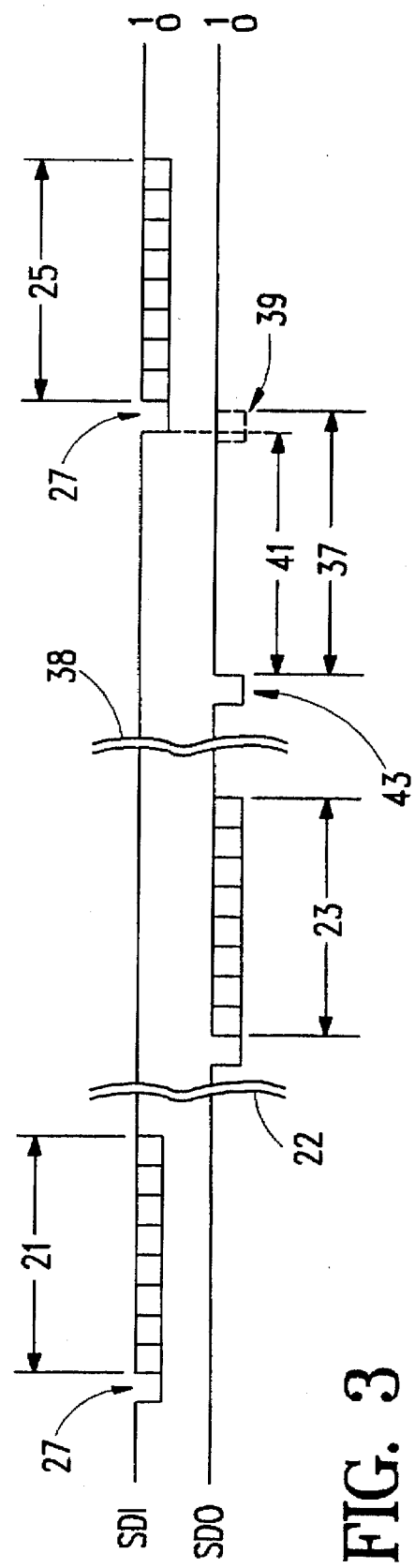

UART PROTOCOL THAT PROVIDES PREDICTABLE DELAY FOR COMMUNICATION BETWEEN COMPUTERS OF DISPARATE ABILITY

TECHNICAL FIELD

The present invention relates to transmission of data from one computer to another computer, and more particularly to a UART protocol for eliminating certain communication problems which occur when computers of disparate ability communicate, problems which are frequently encountered with simple, dedicated-task computers such as those found in the data logging art.

BACKGROUND OF THE INVENTION

Certain inexpensive, dedicated-task computers such as data loggers have relatively low communication capability in comparison to general purpose personal computers. This difference in capability can be in part a result of the architecture of the dedicated-task computer if, unlike the personal computer, the dedicated-task computer uses a software UART rather than a UART chip. The goal of this architecture is to keep cost, size and power drain at a minimum. While it is possible to design a more capable dedicated-task computer, it would be preferable to obtain reliable communication between personal computers and dedicated-task computers having simple software UARTs.

One way to address communications problems between such computers is to introduce software delay routines in the personal computer. The delay routines are intended to slow communication down to a rate which is tolerable for the dedicated-task computer. However, since there are many different personal computers on the market, it isn't possible to generate a single set of delay routines which will provide optimal communication between a dedicated-task computer and any personal computer which it might be used with. Further, since new, faster personal computers are constantly being developed, a given software delay routine will eventually execute more quickly and become inadequate. This produces an enormous logistical problem of providing frequent software updates to a growing base of customers. In any event, software delay routines are inherently inefficient and can slow communication to an unacceptably slow rate.

SUMMARY OF THE INVENTION

An object of the present invention is to provide a UART communication protocol which will allow improved communication between computers with disparate communication ability.

Another object of the present invention is to provide a UART communication protocol which will function for communication between dedicated-task computers and the faster general purpose computers which will be manufactured in the future.

Another object of the present invention is to provide a UART communication protocol which optimizes communication between a host computer and a data logger.

Another object is to provide a protocol for optimizing communication between a hardware UART and a software UART.

According to the present invention, a UART communication protocol for communication between a first microprocessor and a second microprocessor, the first microprocessor with a software UART having an SDO line, the SDO line having a mark state, comprises the sequential steps of:

(A) transmitting one or more bytes of data from the first microprocessor to the second microprocessor; and (B) transmitting one or more dummy bytes from the first microprocessor to the second microprocessor.

Other objects, features and advantages of the invention will become apparent in light of the following description thereof.

BRIEF DESCRIPTION OF THE DRAWING

FIG. 2 is a timing diagram illustrating a communication problem associated with the devices of FIG. 1.

FIG. 3 is a timing diagram illustrating a novel communication protocol for the devices of FIG. 1.

BEST MODE FOR CARRYING OUT THE INVENTION

Figure 1:
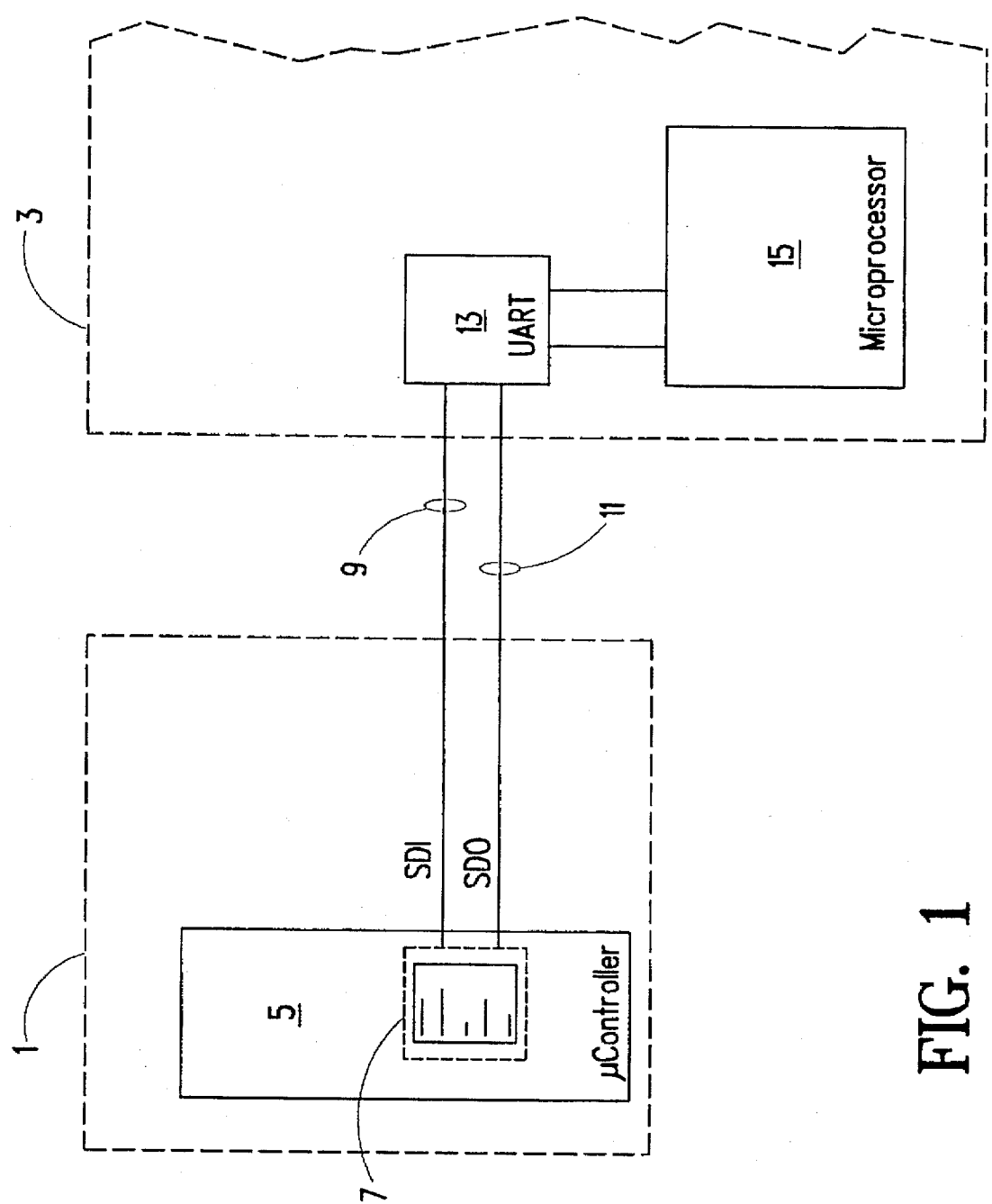
FIG. 1 is a schematic/block diagram of a data logger and a host computer.

FIG. 1 is a schematic/block diagram of a data logger 1 and a host computer 3. The data logger 1 includes a microcontroller 5 and a software universal asynchronous receiver transmitter ("software UART") 7 with a serial data in ("SDI") line 9 and serial a data out ("SDO") line 11. The host computer 3 includes a UART chip 13 and a microprocessor 15. The host computer and data logger are connected for serial communication, such as data download or mission configuration, via the SDI and SDO lines. Data sent by the microcontroller 5 over the SDO line 11 is received by the UART chip 13, and then passed on to the microprocessor 15. Data sent by the microprocessor 15 passes through the UART chip 13, and from there on to the microcontroller 5. For the purposes of this disclosure, a microcontroller is an integrated microprocessor which includes certain features which are often placed on peripheral chips. It will be appreciated, however, that the present invention is not dependent on the particular type of processing devices used.

The data logger 1 functions to monitor physical properties such as temperature and relative humidity over extended periods of time. The logger 1 is configured for its mission while connected to the host computer 3. Configuration data (not specifically shown) is sent to the logger 1 from the host computer 3 on the SDI line 9. Such configuration data may include, inter alia, a time to begin logging and an interval to wait between measurements. After being configured, the logger is disconnected from the host computer and placed in its monitoring site, e.g., placed in a crate of fruit to monitor temperature at predetermined intervals during transit. After the mission is complete, the logger is connected to another host computer and the logger's data is downloaded for analysis. The host computer may be any common, general purpose personal computer.

Data loggers 1 often operate over extended periods of time in hostile environments, and a certain percentage of loggers are expected to be destroyed during their mission. For this reason it is desirable to keep the power drain and cost of the logger to a minimum, and a microcontroller 5 selected from the PIC 16CXX family is a suitable choice to control the logger. Of course, it is almost always desirable to keep costs low, regardless of the likelihood that the device in question may be destroyed.

The SDI line 9 and SDO line 11 each have a mark state and a space state. The SDI line 9 mark state, which is the state sensed by the microcontroller 5 when no signal is coming in from an external device, is HI. That is, a line 17 between the Software UART 7 and the microcontroller 5 is normally HI, until pulled LO by the UART chip 13. Similarly, the mark state of the SDO line 11 is HI, i.e., the host computer 3 will sense the SDO line 11 as HI when the microcontroller 5 is not sending data.

FIG. 2 is a state diagram which illustrates a communication problem associated with the data logger and host computer of FIG. 1. As described above, the host computer 3 (FIG. 1) configures the data logger 1 (FIG. 1) for its mission by sending configuration data to the microcontroller 5 (FIG. 1). The configuration data is sent one byte at a time on the SDI line. When a byte 21 is sent, it is stored in the data logger. Storing the byte 21 takes a certain amount of time 22, which is not critical to this invention. After storing the byte 21, the data logger signals readiness to receive another byte 25 by echoing the stored byte 21 back to the host computer on the SDO line, i.e., sending an echoed byte 23. Another byte 25 of configuration data is sent by the microprocessor when the echoed byte 23 is received.

The microcontroller initiates communication by pulling the SDI line LO to provide a start bit 27. The microcontroller then sends eight bits of data, starting with a least significant bit ("LSB") 29 and ending with a most significant bit ("MSB") 31. Finally, the microcontroller provides a stop bit 33, which is HI. Typically, however, the stop bit 33 has little or no role in communication, the host computer and data logger keying instead on the MSB 31.

The problem addressed by the present invention occurs because the host computer UART chip 13 (FIG. 1) sends the next byte 25 of data as soon as the echoed byte 23 is received. Depending on communication speed, a sophisticated host computer with an advanced design microprocessor and UART chip may effectively receive the echoed byte 23 before the MSB 31 is completely sent by the microcontroller, and begin sending the next byte 25 of data before the software UART 7 (FIG. 1) is ready to receive. The software UART (and thus the microcontroller) are fully occupied with the task of sending the MSB for the duration of the MSB. The UART chip, on the other hand, may sample the MSB one or more times and then commence transmission of the next byte. If the microcontroller is a PIC 16C54, the microprocessor an Intel Pentium and the UART chip a 16550, this problem will certainly evidence itself at a communication speed of about 1200 baud. Sampling the SDI line about once every three instruction cycles at 1200 baud may result in the software UART missing the start bit, and it generally isn't possible to sample at a faster rate because other tasks must be addressed by the microcontroller. That is, if the UART chip transmits the start bit at a point 36 which is part way through the MSB 31 of the echoed byte 23, and the software UART samples the SDI line on the third instruction cycle following the MSB, it is likely that the software UART will sample the SDI line at a point beyond the start bit, thus missing the start bit altogether. The first LO bit in the next byte will then likely be interpreted as the start bit 27. The result is either greatly slowed communication or complete communication breakdown.

In order to provide smoother and more reliable communication, it is desirable that the microprocessor not send the next byte 25 until the microcontroller has finished transmitting the echoed byte 23. It may also be desirable to have a brief delay between receiving the echoed byte in the host computer and the sending the next byte to the microcontroller. The UART protocol of the present invention introduces a reliable and efficient transmission delay until the microcontroller is prepared to receive the next byte.

FIG. 3 is a timing diagram illustrating a novel UART communication protocol which addresses the problem illustrated in FIG. 2. The protocol takes advantage of the mark state (HI) of the SDO line in order to provide time for the microcontroller 5 (FIG. 1) to prepare for incoming data on the SDI line 9 (FIG. 1). According to the protocol, the microprocessor starts by sending the first byte 21 of configuration data to the microcontroller over the SDI line. That byte 21 of configuration data is subsequently received by the microcontroller and stored in the data logger. The microcontroller then echoes that byte 21, i.e., transmits the echoed byte 23, followed by a dummy byte 37, on the SDO line. There may be a period of time (Δt) 38 between the echoed byte 23 and the dummy byte 37. The microprocessor sends the next byte 25 of configuration data when the dummy byte 37 is received, perhaps part way through a MSB 39 of the dummy byte 37 depending on the behavior of the microprocessor. Other than waiting to receive it, the dummy byte 37 is ignored by the host computer, which distinguishes the dummy byte from real data which is being echoed.

In order to provide the microcontroller with the greatest amount of time, the dummy byte 37 may have the binary value (11111111). Since the mark state of the SDO line is HI, sending (11111111) requires almost no microcontroller CPU time. The microcontroller simply pulls SDO LO for a start bit 43, and then forgets about the line altogether by placing the SDO line 11 in the mark state. The microcontroller thus has a period 41 between sending the start bit 43 and receiving the start bit 27 from the host computer to prepare for the next incoming byte 25 of mission configuration data.

Other values or blocks of dummy bytes could also be used, and those skilled in the art will appreciate how to make such modifications to modify this protocol for any system in light of the present disclosure. For example, the following dummy bytes would each provide a delay given an SDO line with a HI mark state: (11111111), (X1111111), (XX111111), (XXX11111), (XXXX1111), (XXXXX111), (XXXXXX11), (XXXXXXX1), or any other value as long as the MSB corresponds to the mark state of the SDO line. Also, although the present invention has been described with respect to a data logger, the invention is not limited to that particular application. Indeed, a variety of modifications and variations of the present invention are possible in light of the above teachings. It is therefore to be understood that, within the scope of the claims, the present invention may be practiced otherwise than specifically described hereinabove.

What is claimed is:

1. A communication protocol for asynchronous serial communication between a first device and a second device, the protocol controlling communication rate based on the first device and comprising the sequential steps of:

(A) in a first transmitting step, transmitting at least one byte of data from the first device to the second device; and (B) in a second transmitting step following the first transmitting step, transmitting at least one dummy byte from the first device to the second device, whereby a predictable delay that is controlled by the first device is provided.

2. The communication protocol of claim 1 wherein a mark state is defined for such serial communication, and wherein said at least one dummy byte is produced by transmitting at least one bit from the first device to the second device in the mark state.

3. The communication protocol of claim 2, wherein the mark state is a logic "1" and a single dummy byte with a value (XXXXXXX1) is transmitted from the first device to the second device, where "X" indicates "don't care."

4. A universal asynchronous receiver-transmitter ("UART") communication protocol for sending configuration data in a serial fashion from a host computer to a data logger that employs a software UART, such configuration data being represented by a digital signal having first and second states, the first state being a mark state, comprising:

(A) transmitting a byte of configuration data from the host computer to the data logger;

(B) receiving said byte of configuration data in said data logger;

(C) echoing said byte of configuration data back to the host computer;

(E) transmitting a dummy byte from the data logger to the host computer by transmitting a start bit and then transmitting at least one bit in the mark state; and (F) transmitting another byte of configuration data from the host computer to the data logger after said dummy byte is received by the host computer.

5. A system for communicating between a first processing device and a second processing device, comprising:

a software universal asynchronous receiver-transmitter ("UART") executed in the first processing device;

a UART chip connected to the second processing device; and a communication line controllable by said software UART, said communication line connecting said software UART to said UART chip for transmission of data between the first processing device and the second processing device, said software UART producing at least first and second signal states wherein one of said first and second signal states comprises a mark state, and wherein said communication line remains in said mark state when not controlled by said software UART, the first processing device sending at least one dummy byte to the second processing device after sending at least one data byte, the at least one dummy byte being sent by sending a start bit and then placing said first communication line in said mark state.

* * * * *